United States Patent [19]

Schechter

[11] Patent Number: 4,468,960
[45] Date of Patent: Sep. 4, 1984

[54] GLIDE PATH INDICATOR FOR AIRCRAFT

[76] Inventor: Emanuel S. Schechter, 17 Driftwood Dr., Glen Cove, N.Y. 11542

[21] Appl. No.: 375,579

[22] Filed: May 6, 1982

[51] Int. Cl.³ .......................... G01C 21/00; B64F 1/18
[52] U.S. Cl. ................................ 73/178 R; 73/178 T; 33/283; 116/DIG. 43; 244/1 R
[58] Field of Search .......................... 73/178 T, 178 R; 33/264, 286, 283, 227; 353/11, 12; 244/1 R; 116/DIG. 43; 350/110; 340/27 NA

[56] References Cited

U.S. PATENT DOCUMENTS 3,488,427   1/1970   Anthony ........................... 73/178 R Primary Examiner—S. Clement Swisher
Assistant Examiner—Anna Schrichte
Attorney, Agent, or Firm—Edward H. Loveman

[57] ABSTRACT

A glide path instrument for an aircraft to display to a pilot that the aircraft is descending on a predetermined inclined glide path. The instrument includes a rectangular casing mountable in stationary position in the aircraft and carrying a freely pivotable frame which has sighting elements at opposite ends spaced different vertical distances from the plane of the frame. The frame carries a pendulum-like structure including depending legs supporting free swinging weights. The sighting elements align in a single sight plane with a runway reference point when the aircraft is at the predetermined glide angle. A lamp in the casing illuminates the sighting elements.

10 Claims, 8 Drawing Figures

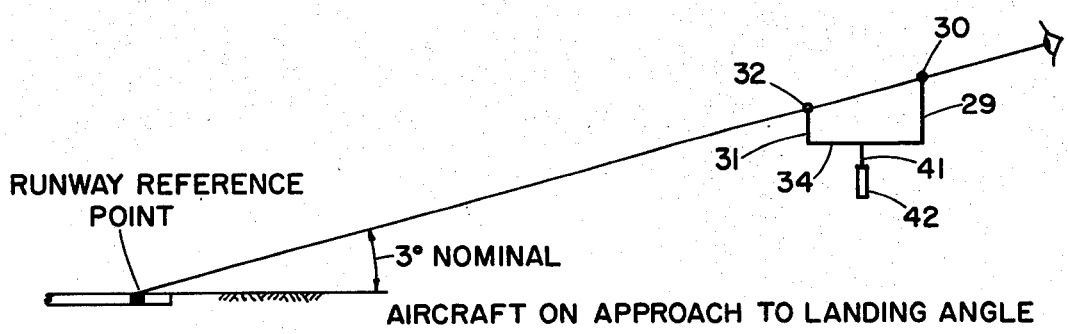
Fig. 6 AIRCRAFT ON APPROACH TO LANDING ANGLE
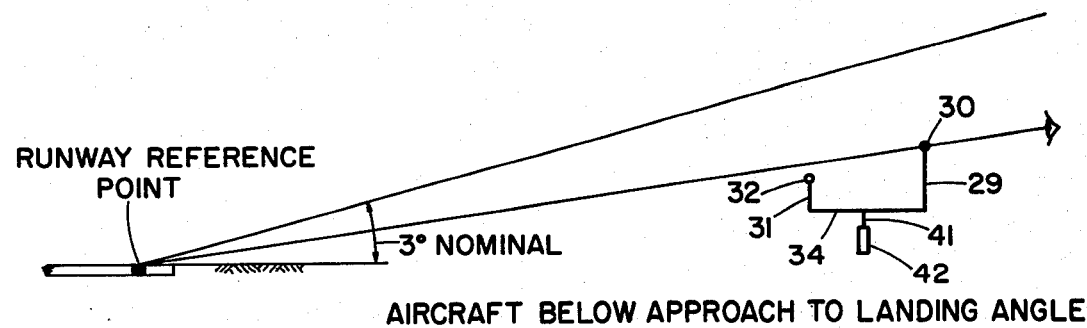
Fig. 7 AIRCRAFT BELOW APPROACH TO LANDING ANGLE
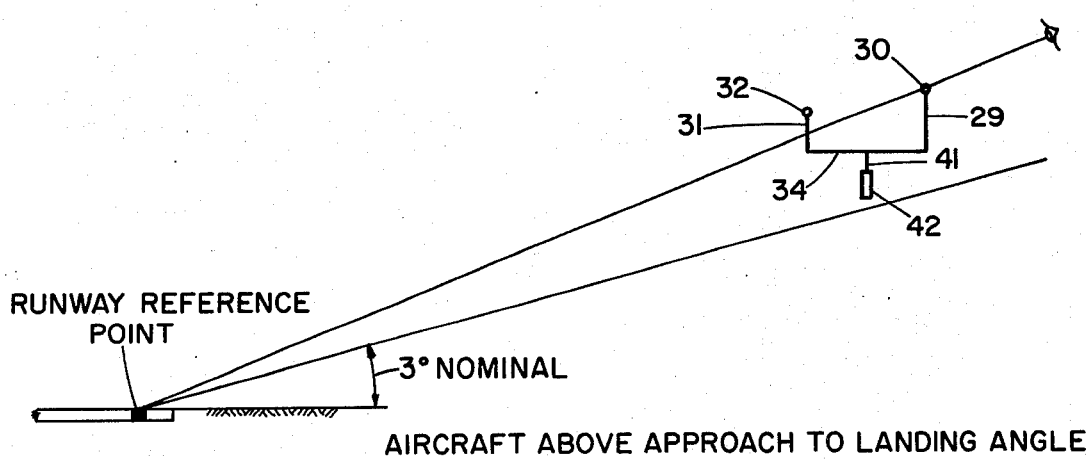
Fig. 8 AIRCRAFT ABOVE APPROACH TO LANDING ANGLE

GLIDE PATH INDICATOR FOR AIRCRAFT

This invention relates to the act of aircraft indicating instruments, and more particularly concerns an aircraft indicating instrument which serves to indicate the proper glide path for a descending aircraft.

Heretofore it has been conventional to employ ground initiated complex instrument and/or electronic systems to provide a visual indication to a pilot that his aircraft is descending in a predetermined glide path to a landing field. Normally the glide path of an aircraft approaching a runway reference point at an aircraft landing field is 3° nominally. The present invention, is thus, directed at a mechanical instrument which provides an optical indication that an aircraft is moving in the aforesaid predetermined angular glide path. The invention is adapted for use in large and small aircraft.

According to the invention, the instrument includes a box or casing with a frame which is pivotally mounted inside the casing to pivot on a horizontal axis. The frame has two elevated spaced horizontal sights at opposite ends. The instrument is disposed and mounted in or near the line of sight of the pilot of an aircraft. The front sight (furthermost from the pilot) has an indicant or symbol representing the aircraft. The frame may carry a weight which can be adjusted so that the front sight is 3° below the rear sight. During descent of the aircraft, at the preselected angle of 3°, and with the rear sight visually aligned with the runway reference point, the pilot controls the aircraft by conventional means so that the runway reference point and the front, and rear sights remain in constant alignment during the landing approach.

It is therefore a principal object of the present invention to provide a glide path indicator instrument for an aircraft wherein a privotally mounted frame carried spaced sights which align in a single plane at a predetermined angle with the horizontal plane.

Another object of the present invention is to provide a glide path indicator instrument as described, wherein the pivotally mounted frame carries a massive weight or weights freely swingable like a pendulum.

Still another object of the present invention, is to provide an indicator instrument described, wherein the mounting box carries a lamp for illuminating the spaced sights.

Another further object of the present invention, is to provide an indicator instrument as described wherein the spaced sights may be coated with fluorescent material to glow in the dark, and thus, visible at all times to a pilot.

These and other objects and many of the attendant advantages of this invention will be readily appreciated as the same becomes better understood by reference to the following detailed description when considered in connection with the accompanying drawings in which:

FIG. 6 is a diagramatic representation of an aircraft on the desired angle of approach to a landing area;

FIG. 7 is a diagramatic representation of an aircraft approaching a landing area below the desired angle; and FIG. 8 is a diagramatic representation of an aircraft approaching a landing area above the desired angle of approach.

Figure 1:
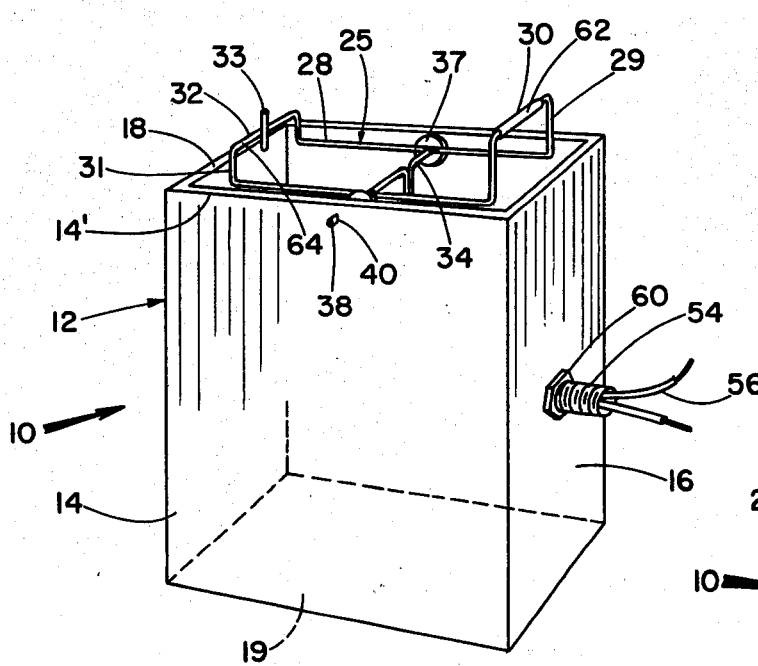
FIG. 1 is a perspective view of an indicator instrument embodying the invention.
Figure 4:
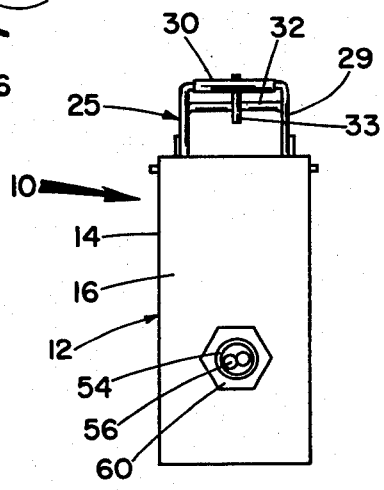
FIG. 4 is a fragmentary front end elevational view taken along line 4—4 of FIG. 2.
Figure 2:
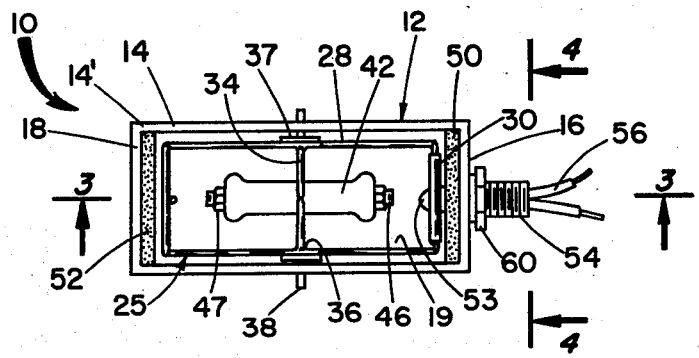
FIG. 2 is a top plan view of the indicator instrument.
Figure 3:
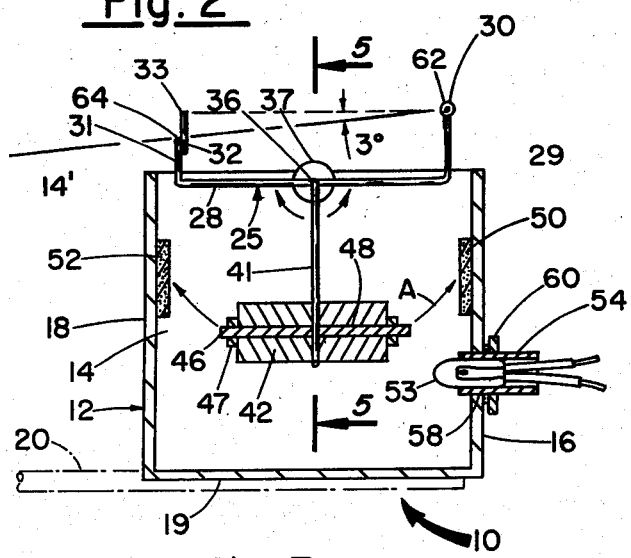
FIG. 3 is a central vertical sectional view taken along line 3—3 of FIG. 2.

Referring now to the drawings wherein like reference characters designate like or corresponding parts throughout, there is illustrated in FIGS. 1-5, an indicator instrument generally designated by reference numeral 10 embodying the invention and which includes a rectangular box or casing 12 having flat rectangular parallel side walls 14, front end wall 16, rear end wall 18, and bottom wall 19. The casing 12 is open at the top. The instrument 10 may be mounted on a horizontal shelf 20 indicated by dashed lines in FIG. 3.

Near the upper edges 14' of side walls 14 is a pivotally mounted wire frame 25, which is generally rectangular and includes two parallel side bars 28 bent upwardly at their front end to define vertical fingers 29 joined by integral cross wire or front sight 32. A pin or indicant 33 is centrally mounted perpendicular to cross wire 32. Frame 25 is centrally pivoted on a cross shaft 34 secured by solder or welding 36 to the centers of side bars or wires 28. A pair of circular flanges or spacers 37 are secured on shaft 34 outside the side bars 28. Ends of the cross shaft 34 define pin shafts 38 which are rotatably journaled in holes 40 near the top 14' of the side walls 14.

Figure 5:
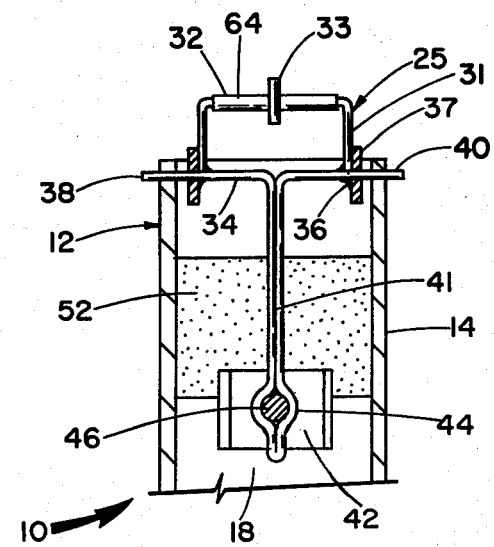
FIG. 5 is an enlarged fragmentary vertical cross sectional view taken along line 5—5 of FIG. 3.

The cross shaft 34 may be formed of wire and have a pair of integral depending, downwardly extending legs 41 carrying a pair of weights 42, as best shown in FIG. 5. The legs 41 may abut and define an eye 44 near the bottom end of the legs 41. A screw 46 extends axially through a bore 48 in the weights 42, the eye 44, and another bore 48 in the weights 42. The weights 42 may swing in pendulum fashion as indicated by arrows A in FIG. 3. The screw 46 may be adjustably turned to move axially through bore 48 so one end or the other projects further from the weights 42 to adjust the rear sight 30 with respect to the front sight 32 as will be hereinafter more specifically described. Nuts 47 lock screw 46 in place.

It will be noted that the rear fingers 29 are longer than the front fingers 31. By this arrangement, the angle between the rear sight 30 and the front sight 32 is 3°, as viewed in FIG. 3. It should also be noted that the top of the sight 33 is aligned with the center of the rear sight 30.

A lamp 53 mounted in a tubular insulated housing 54 may project into casing 12 to illuminate sights 30, 32, and 33, when the lamp is energized via wires 56 which extend outwardly of the casing 12. The housing 54 may be threaded and screwed into a hole 58 in the front wall 16 of the casing 12. A nut 60 screwed on the housing 54 locks the housing 54 in place.

Sights 30 and 32 along with the pin or airplane symbol 33 may be coated with fluorescent material 62, 64 to glow brightly so that the sight wires are clearly visible at all times.

In operation of the instrument, housing 12 may be mounted on a horizontal shelf or support 20. During descent of the aircraft, on an approach to landing, the pilot will visually align the rear sight 30 with a runway reference point on the landing area, i.e. lights, line, marker, edge, etc. If the front sight 32 is visually above the aligned rear sight 30, and the runway reference point, then the aircraft is above the desired angle of approach to the landing area as illustrated in FIG. 8. If the front sight 32 is visually below the aligned rear sight 30 and runway reference point, then the aircraft is below the desired angle of approach to the landing area as illustrated in FIG. 7. The pilot will then operate the aircraft with his conventional aircraft and engine controls to align the front sight 32 with the runway reference point and rear sight 30. When they are thus aligned, the aircraft is exactly on the desired angle of approach to the landing area as illustrated in FIG. 6.

The instrument is simple, lightweight, rugged, inexpensive to manufacture, and accurate. It is simple to install without special tools. Alignment of the instrument is accomplished via rotation of the screw 46 and then securing the position thereof with the lock nuts 47. Usage requires no special skill or training. The instrument will provide long, useful, troublefree service.

Although the glide path indicator is illustrated with an open top, it is obvious it may be manufactured in a totally enclosed case and may contain a damping fluid. It is also clear that although the instrument has been illustrated with a pendulum as the stabilizing device, many other mechanism may be used, i.e. a gyro.

It should be understood that the foregoing relates to only a limited number of preferred embodiments of the invention which has been by way of example only, and that it is intended to cover all changes and modifications of the example of the invention herein chosen for the purposes of the disclosure, which do not constitute departures from the spirit and scope of the invention.

What is claimed is:

1. An instrument for indicating that an aircraft in which the instrument is mounted is disposed in a predetermined glide path with a runway reference point, comprising:

a support mountable in stationary position in the aircraft;

an elongated pivotable member carried by said support to pivot angularly around a horizontal axis which is parallel to a lateral axis of said aircraft;

front and rear spaced apart sighting elements carried in horizontally spaced positions by said member, said elements being respectively elevated different distance from said member so that said sighting elements are normally disposed in different vertically spaced horizontal planes; and stabilizing means carried by said member and freely swingable therewith to pivot said member so that when one of said sighting elements is aligned with said runway reference point and said aircraft is manuevered so that the other of said sighting elements, said runway reference point and said one sighting element are aligned, said aircraft will be in said predetermined glide path.

2. An instrument as defined in claim 1, wherein said member is a substantially rectangular frame, and wherein said sight elements are integral with said frame at opposite ends thereof.

3. An instrument as defined in claim 1, wherein said one sighting element is a horizontal bar.

4. An instrument as defined in claim 2, wherein said stabilizing means comprises an elongated swingable shaft means carried by said frame and a massive weight means mounted at one end of said shaft means to pivot said member.

5. An instrument as defined in claim 2, wherein said one sighting element is at a higher elevated distance from said member than said other of said sighting elements.

6. An instrument as defined in claim 5 wherein said stabilizing means comprises an elongated swingable shaft means carried by said frame and a massive weight means mounted at one end of said shaft means to pivot said member.

7. An instrument as defined in claim 6, wherein said one sighting element is a horizontal bar.

8. An instrument as defined in claim 1, wherein said other of said sighting elements has an indicant centrally mounted thereon.

9. An instrument as defined in claim 8, wherein a portion of said indicant is at substantially the same elevated distance from said member as said one sighting element.

10. An instrument as defined in claim 1, further comprising lamp means mounted in said casing for illuminating said sighting elements, said sighting elements being coated with a material which renders said sighting elements visible at all times.

* * * * *